Nov. 7, 1933.   J. LEHMKUHL   1,933,813
ELECTRIC WASHING MACHINE FOR CLEANING FABRIC OR OTHER WOVEN MATERIAL
Filed Jan. 3, 1933
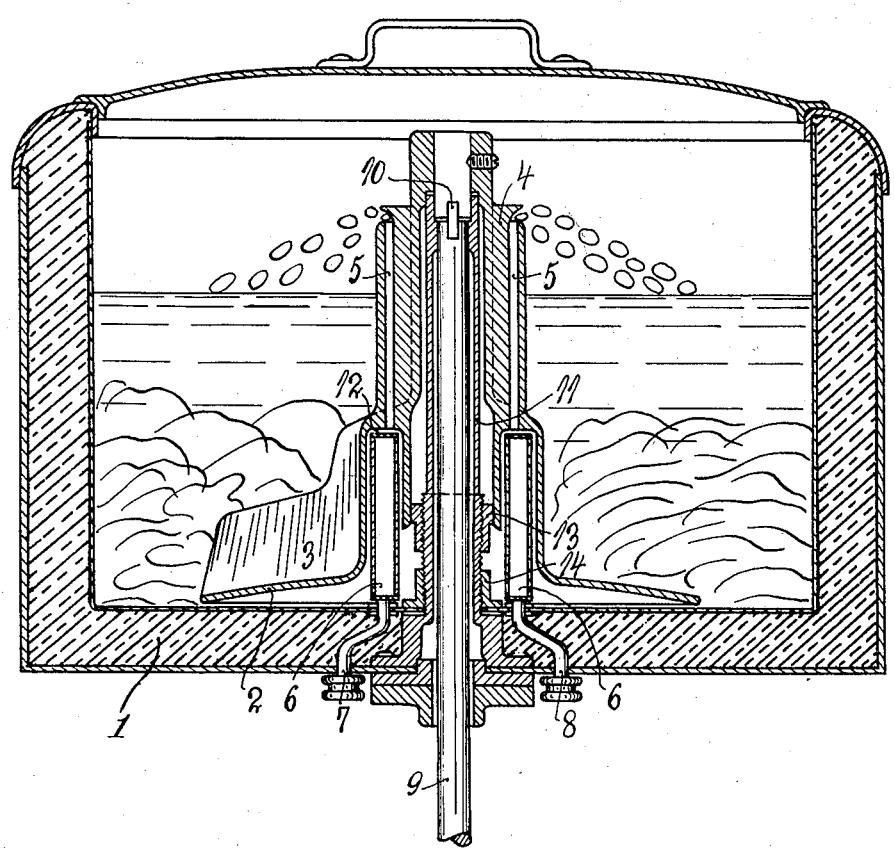
Inventor:
Joachim Lehmkuhl,
By Byrne, Townsend & Potter,
Attorneys.

Patented Nov. 7, 1933

1,933,813

UNITED STATES PATENT OFFICE 1,933,813

ELECTRIC WASHING MACHINE FOR CLEANING FABRIC OR OTHER WOVEN MATERIAL

Joachim Lehmkuhl, Oslo, Norway

Application January 3, 1933, Serial No. 650,017, and in Norway February 2, 1932

3 Claims. (Cl. 68—15)

This invention relates to electrical washing machines of the type which comprises a container, adapted to hold the washing liquid and the goods to be cleaned, and a mechanically driven agitator in said container, adapted to set the washing liquid as well as the goods to be washed into motion. More especially, this invention relates to a washing machine of the above mentioned type in which means are provided to furnish heat to the liquid while the machine is in operation.

One object of this invention is to arrange electric heating means in a new and extremely efficient way. A further object is to provide means for increasing the circulation of the liquid in the container, whether the agitator is working or not.

To this end an electric heating element is arranged within the body of the agitator, so that the heat from the element will be transferred primarily to the liquid through the body of the agitator. When the agitator is moving, a constant stream of liquid will pass over its surface and remove the heat from same.

In order to ensure a steady circulation of the liquid when the agitator is not moving, channels are arranged through the agitator and beside the heating element, so that the heated liquid passes from below through the said channels and back to the body of liquid at the top of the agitator.

In order to make the invention readily understood, it shall, in the following, be described with reference to the drawing showing a vertical cross section through a preferred embodiment of the invention.

In the drawing, the washing machine consists of a heat insulated container 1, substantially in the center of which is arranged an agitator 2, having vanes or webs 3 with turned over lower edges. The agitator 2 has an upwardly extending central body portion 4 provided with channels 5, which communicate with the container at the upper end of the body portion 4 and preferably above the normal level of liquid in the container. From below and extending upwardly into the agitator, an annular chamber 12 is provided, adapted to receive one or more correspondingly shaped electric heating elements 6, which by means of leads 7 and 8 is connected to a suitable source of energy, not shown.

The agitator 2 is supported on the vertical shaft 9, extending into the container 1 from below. The shaft 9 is keyed to the agitator by means of a key 10, and surrounded by guiding means 11 and 13 as well as a stuffing box 14, which is pressed against the bottom of the container.

Suitable driving means, not shown, may be arranged in connection with that part of the shaft 9 which extends out through the bottom of the container.

The washing machine above described may be used for cleaning in different ways. The clothes to be washed may be placed in the container 1, and current may be furnished to the heating element 6 whereby the liquid will be gradually heated.

When the heat of the liquid has reached a certain degree, the water will be forced to circulate in the same way as in a coffee percolator.

The washing machine can further be used as an ordinary washing machine with agitator, and finally as a combination of both.

It must be understood that the foregoing description with reference to the drawing is a preferred embodiment only, and that the invention is limited by the scope of the claims only.

I claim:

1. A washing machine for cleaning fabric and the like comprising a container adapted to receive the cleaning liquid and the material to be cleaned, an agitator arranged in said container, means for actuating said agitator, and electrically energized heating means for heating the cleaning liquid, said electric heating means comprising a heating element rigidly mounted on the bottom of the container and projecting into the same, and the said agitator being provided with an annular groove to receive the said heating element.

2. A washing machine for cleaning fabric and the like comprising a container adapted to receive the cleaning liquid and the material to be cleaned, an agitator arranged in said container, means for actuating said agitator, and electrically energized heating means for heating the said cleaning liquid, said electric heating means comprising a heating element rigidly mounted on the bottom of the container and projecting into the same, the said agitator being provided with an annular groove, adapted to receive the said heating elements, and a channel for the passage of cleaning liquid from said annular groove through the body of the said agitator.

3. A washing machine comprising a container, an agitator within said container mounted to rotate on a vertical axis, means for moving said agitator, an annular groove extending upwardly from the base of said agitator, a stationary heating element projecting into said groove, and a channel extending upwardly from said groove through the agitator.

JOACHIM LEHMKUHL.